United States Patent Office 2,824,035
Patented Feb. 18, 1958

2,824,035
PROCESS OF MAKING STIFFENED COMPOSITE FABRICS

Donald Finlayson, Maitland Walton Alford, and William Parkes Pfeil, Spondon, near Derby, England, assignors to British Celanese Limited, a corporation of Great Britain No Drawing. Application January 11, 1955
Serial No. 481,282

Claims priority, application Great Britain
January 12, 1954

2 Claims. (Cl. 154—115)

This invention relates to composite fabrics, and especially to fabric laminates of the kind comprising two or more fabric layers bonded together by thermoplastic material.

Fabric laminates of the kind referred to above are largely used in making articles of wearing apparel, such as semi-stiff collars. For this purpose a three-ply laminate is used, the outer layers usually consisting of a non-thermoplastic material, e. g. cotton, linen or regenerated cellulose, and the intermediate layer (the "interlining") consisting of a fabric containing fibres of acetone-soluble cellulose acetate. (The word "fibres" is used in this specification to include continuous filaments as well as staple fibres.) Bonding is effected by subjecting the assembly of fabric layers to heat and pressure, after impregnating the interlining with a volatile liquid that assists the flow of the cellulose acetate at the temperature of pressing.

We have now found that excellent fabric laminates can be made from assemblies of fabric layers at least one of which contains fibres of a cellulose acetate of acetyl value between 58 and 62.5. (The acetyl values throughout this specification are expressed as percentages of combined acetic acid.) Such cellulose acetates are not soluble in acetone. In laminates containing a cellulose acetate of the high acetyl value specified, we have obtained excellent laundering properties. The laminates have withstood many cycles of washing, followed by ironing, without becoming glazed, or soft when dry, and without any sign of separation of the layers.

According, therefore, to the present invention, a fabric laminate is made by bonding together, under the action of heat and pressure, a plurality of fabric layers, at least one of which contains fibres of a cellulose acetate of acetyl value between 58 and 62.5. (Such fibres are referred to below as "the high-acetyl fibres," and the cellulose acetate of which they are made is referred to as "high-acetyl cellulose acetate.") Of particular importance are three-layer laminates containing the high-acetyl fibres in the interlining, the outer layers being of non-thermoplastic fibre, e. g. cotton, linen or regenerated cellulose.

As indicated above, the acetyl value of the high-acetyl cellulose acetate may range from 58–62.5. Preferably, the acetyl value lies within the range 60–62.5, i. e. the cellulose acetate is preferably of the kind commonly described as "cellulose triacetate."

The high-acetyl fibres can be obtained by wet- or dry-spinning, using solvents such as methylene chloride diluted with a small proportion of methanol. The best results, however, have been obtained with high-acetyl fibres which have been melt-spun, i. e. extruded in a temporarily plastic condition brought about by heat in the absence of volatile solvents for the thermoplastic material. A particularly suitable method of obtaining the fibres is that described in United States patent application Ser. No. 243,994, filed August 28, 1951, wherein fibre-forming thermosplastic material in powder form is urged (e. g. by rapidly reciprocated tamper) against one face of a heated plate having spinning orifices therein, so that the powdered material is fused by heat applied to the plate. The material is continuously supplied to the plate, and the fused material is drawn away through said orifices in the form of filaments. The filaments obtained by this process differ from dry- or wet-spun filaments in several respects: they are, in general, much more nearly round in cross-section (assuming that spinning has been effected through circular orifices); they have a much higher degree of molecular orientation as shown by X-ray analysis, they shrink much more when soaked in methylene dichloride, and they are quite free from volatile solvent. These properties, in a manner which is not at present understood, appear to contribute towards the success of the present invention, and some advantage is obtained in making fabric laminates, even when fibres of acetone-soluble cellulose acetate melt-spun by the method referred to are used instead of wet- or dry-spun acetone-soluble cellulose acetate fibres.

The construction of the interlining fabric may be varied according to the porosity required in the product. When high porosity is not required, the interlining may be made entirely of the high-acetyl fibres. More porous fabrics are obtained, i. e. fabrics more readily penetrable by liquid water and water-vapour, when the interlining consists of a fabric containing the high-acetyl fibres in admixture with non-thermoplastic material. Very useful results have been obtained with interlinings consisting of yarns of the high-acetyl fibres interwoven with yarns of cotton or other non-thermoplastic material, the weight of the cellulose acetate being about 20–40% of the total fabric weight. The weight-percentage of the high-acetyl fibres in a mixed fabric interlining may, of course, be higher than 40%, e. g. up to 50% or between 50 and 100%, for instance 60–80%. Mixed yarns may also be used in the interlining, e. g. yarns of continuous-filament high-acetyl cellulose acetate doubled with continuous-filament regenerated cellulose yarns or yarns spun from staple fibres of the high-acetyl cellulose acetate in admixture with staple fibres or regenerated cellulose.

The interlining may be plain-woven, or special constructions may be adopted to bring the yarn consisting of or containing the high-acetyl cellulose acetate to the surface. Suitable constructions are described in United States Patent No. 2,158,112. Instead of a woven fabric, a knitted fabric may be used as the interlining, and this may consist wholly of the high-acetyl fibre, or of this in admixture with non-thermoplastic fibre. A further alternative is to form the interlining fabric of unwoven staple fibres of the high-acetyl cellulose acetate alone or in admixture with non-thermoplastic staple fibres.

The bonding of the fabric layers together is preferably effected in a heated press, e. g. a "daylight" press having polished platens. To facilitate bonding, the interlining or the assembly of fabrics may, before pressing, be impregnated with a volatile liquid that, at the temperature of pressing, has a strong softening, or even solvent, action on the high-acetyl cellulose acetate, but not on the non-thermoplastic fibre. We have found that the softening agents commonly used in making fabric laminates from fabric assemblies in which the thermoplastic material is acetone-soluble cellulose acetate, e. g. concentrated aqueous solutions of methanol or ethanol, are ineffective with the cellulose acetates of high-acetyl value. Suitable softening liquids can, however, be formulated with a basis of methylene dichloride or ethylene dichloride, preferably diluted with not more than its own volume of methanol or ethanol. The softening liquid may be a solvent for the high-acetyl cellulose acetate at ordinary temperatures (as is, for instance, a mixture of methylene dichloride and methanol in proportions of 9:1 by volume). Preferably, however, the softening liquid develops solvent properties only at temperatures in the neighborhood of the temperature at which pressing is to be effected. Solvents for acetone-soluble cellulose acetate may be present in the softening liquid. Such solvents may include volatile liquids such as acetone, methyl ethyl ketone and ethyl acetate, but we have found it of greater advantage to have present a minor proportion, relative to the chlorinated hydrocarbon, of a high-boiling solvent for acetone-soluble cellulose acetate, e. g. diacetone alcohol, ethyl lactate, cyclohexanone or cyclopentanone. A particularly suitable assisting liquid has the following composition by volume: 9–13% cyclohexanone; 15–25% isopropanol; 62–78% acetone. Other assisting liquids which are particularly useful though inferior to the last-mentioned mixture can be formulated by admixture of isopropyl alcohol, a major proportion of acetone, or methyl cyclohexanone and toluene.

A plasticizer for the high-acetyl cellulose acetate may be present during bonding. This may conveniently be applied in solution in the softening liquid. Suitable plasticizers include dimethyl phthalate, diethyl phthalate, dibutyl phthalate, tripropionin, tributyrin, methyl phthalyl ethyl glycolate, ethyl phthalyl ethyl glycolate, butyl phthalyl butyl glycolate, glycol acetate-benzoate, p-toluene sulphonamide, 1:3-butane-diol diacetate, 1:4-butane-diol diacetate and 1:2:5-pentane-triol triacetate.

The temperature at which bonding is effected will depend upon the nature of the particular high-acetyl cellulose acetate present, and that of the softening liquid. In general, with interlinings containing a cellulose acetate of acetyl value between 58 and 62.5, temperatures between 150 and 200° C. have been found suitable.

In making articles such as semi-stiff collars it is convenient, before the pressing operation, to cut the fabrics to the desired shape and assemble them and sew them together to prevent relative displacement of the layers occurring before the bonding has been effected.

The following examples illustrate the invention:

*Example 1*

In making a semi-stiff collar according to this example, the interlining fabric was of the following construction:

Warp: 120 ends per inch, composed of alternate ends of 280-denier cellulose acetate yarn of acetyl value 62, obtained by the melt-spinning process of U. S. patent application Ser. No. 243,994, referred to above, and of cotton yarn of 40s count;
Weft: 76 picks per inch of bleached cotton yarn of 40s count;
Weave: plain.

The two outer layers of the collar were formed of cotton shirting fabric.

The fabrics were cut to shape, assembled in the form of the collar, and soaked at room temperature in methylene chloride.

Excess of methylene chloride was removed, and the assembly was then pressed at 150° C. for two minutes between the polished platens of a "daylight" press. The press was then opened and the finished collar removed.

*Example 2*

A collar assembly was made as described in Example 1, except that the interlining was formed of a fabric having the following construction:

Warp A: 40 ends per inch of 280-denier cellulose acetate yarn, as specified in Example 1;
Warp B: 80 ends per inch of 40s-count bleached cotton yarn;
Weft: 64 picks per inch of 40s bleached cotton yarn;
Warping plan: one end of cotton, one end of cellulose acetate, one end of cotton;
Weave: plain.

The softening liquid consisted of a mixture of methylene chloride and ethanol in the ratio of 3:2 by volume. (The "ethanol" referred to here, and throughout the specification, is of the grade known as industrial alcohol, which contains 8 to 10% by weight of water. Similarly, when other solvents are referred to, the usual commercial grades are to be understood.)

The bonding was effected as in Example 1.

*Example 3*

A collar assembly was made as described in Example 1, except that the interlining fabric was made as follows:

The warp consisted of alternate ends of cellulose acetate and of cotton, each as specified in Example 1. The weft was of the cotton yarn specified in Example 1. The weaving was effected so that the cellulose acetate warps passed over and under alternate pairs of the cotton weft yarns, while the cotton warp yarns passed over and under alternate single weft yarns, so giving a fabric in which the cellulose acetate warp yarns formed floats on both faces, and in which, if those yarns were removed, a plain-woven cotton would remain.

The assembled fabrics were cut and sewn together as described in Example 1, and impregnated in a mixture of methylene chloride with an equal volume of industrial alcohol. Bonding was effected as described in Example 1.

*Example 4*

The process was carried out as in Example 1, except that the softening was effected by means of a mixture of methylene chloride, diacetone alcohol and ethanol in relative proportions of 5:2:3 by volume, and bonding was effected at a temperature of 200° C.

*Example 5*

The process was carried out as in Example 2, except that softening was effected by treatment with a mixture of methylene chloride, diacetone alcohol and ethanol in proportions of 5:3:2 by volume, and bonding was effected at a temperature of 200° C.

*Example 6*

The process was carried out as in Example 2, except that softening was effected by treatment with a mixture of methylene chloride, cyclohexanone and ethanol in proportions of 5:10:4 by volume, and bonding was effected at a temperature of 200° C.

*Example 7*

In making a semi-stiff collar, the interlining was a woven fabric of the following construction:

Warp: 76 ends/inch of twofold bleached cotton yarn of 120s count;
Weft: 60 picks/inch of 140-denier, 48-filament melt-spun cellulose acetate yarn of acetyl value 62;
Weave: plain.

The two outer layers of the collar were formed of cotton shirting fabric.

The fabrics were cut to shape, assembled in the form of a collar, and soaked at room temperature in an assisting liquid of the following composition by volume: 10% cyclohexanone; 20% isopropanol; 70% acetone.

Excess of the assisting liquid was removed and the assembly was then pressed at 150° C. for two minutes between the polished platens of a "daylight" press. The press was then opened and the finished collar removed.

The collar showed a desirable degree of stiffness and strong interlayer adhesion, even after many washing cycles.

The cyclohexanone content of the assisting liquid may be replaced by cyclopentanone.

*Example 8*

The collar assembly of Example 7 was bonded as described in that example, except that the assisting liquid was of the following composition by volume: 20% isopropanol; 80% acetone.

The collar possessed similar properties to that of Example 7, except that the stiffness after repeated washings was slightly less.

*Example 9*

The collar assembly of Example 7 was bonded as described in that example, except that the assisting liquid was of the following composition by volume: 10% a commercial mixture of isomeric methyl cyclohexanones; 30% toluene; 60% acetone.

The collar possessed similar properties to that of Example 7, except that the stiffness after repeated washings was slightly less.

Among other lower aliphatic alcohols, lower acyclic ketones and cyclic ketones that may be employed in formulating the assisting liquid, mention may be made of ethyl-, n-propyl-, secondary butyl- and tertiary butyl-alcohols, of methyl ethyl ketone and methyl isobutyl ketone and of the methyl cyclopentanones. Esters such as methyl acetate, ethyl acetate, methyl benzoate and ethyl benzoate may also be present. Many formulations employing such liquids have been investigated but without finding any as effective as those of the mixtures specified in Examples 7 to 9 above. The excellent combination of properties given by a mixture of cyclohexanone, isopropyl alcohol and acetone in the specified proportions have been approached only by the use of certain liquids containing methylene chloride.

The vapour of methylene dichloride is toxic in high concentrations, and, to avoid any danger on this account, the vapours disengaged in carrying out Examples 1 to 6 were continuously drawn away through suction hoods. Examples 7 to 9 have the advantage that the assisting liquids used therein are free from highly toxic constituents. Indeed, with the exception of toluene, employed in a minor proportion in Example 9, none of the constituents can be regarded as toxic in the sense in which that term is used of industrial solvents. The toxicity of toluene is of a low order and its use under ordinary conditions presents no hazard. Thus, in carrying out the invention as illustrated in Examples 7 to 9, the stringent precautions that are necessary when working with liquids such as benzene and the chlorinated aliphatic hydrocarbons are unnecessary and this is of considerable advantage.

In a similar way to that described above, other semi-stiff articles of apparel, e. g. cuffs, shirtfronts, sweatbands for hats, can be made. When stiffer articles are required, e. g. belts, instead of the three-layer assembly described, four, five or more layers can be bonded together, a layer of the interlining fabric being disposed between each two layers of the non-thermoplastic fabric. On the other hand, when more flexible laminates are required, these can be made by bonding a single layer of non-thermoplastic fabric to a layer containing the high-acetyl cellulose acetate.

Useful results have also been obtained by making laminates in which the interlining contains fibres of the high-acetyl cellulose acetate in admixture with fibres of acetone-soluble cellulose acetate, the acetone-soluble cellulose acetate being softened, for instance, by treatment with a volatile softening liquid that does not swell, or does not unduly swell, the high-acetyl fibre. (By an "acetone-soluble cellulose acetate" is meant one which, like the ordinary cellulose acetates commonly used in artificial-fibre manufacture, is completely soluble in acetone in the cold. The cellulose acetates of this kind most commonly used have acetyl values between 53 and 55%.) In such a laminate the outer layers may be of cotton or other non-thermoplastic fibre. Suitable softening liquids can be formulated by admixture of benzyl alcohol or nitroethane and ethanol. Useful results can also be obtained using ethyl acetate or methyl ethyl ketone, although these liquids have some softening action on the high-acetyl cellulose acetate.

Another alternative is to form the outer layers of the laminates of the high-acetyl cellulose acetate fibres, and to form the interlining of acetone-soluble cellulose acetate fibres, alone or in admixture with high-acetyl fibres. The softening of the acetone-soluble cellulose acetate can then be carried out as described above, without unduly softening the high-acetyl fibres, so that bonding can be effected without damage to the outer layers.

The following examples illustrate the manufacture of a collar having outer layers of high-acetyl cellulose acetate and an interlining containing acetone-soluble cellulose acetate:

*Example 10*

The interlining was a fabric of the construction specified for the interlining of Example 1, except that the cellulose acetate was of acetyl value 54–54.5%.

The outer layers were composed of a shirting fabric woven from staple-fibre yarn containing equal parts by weight of melt-spun 3-denier staple fibres of cellulose acetate of acetyl value 60–62.5 and 1.5-denier regenerated cellulose staple fibres.

The fabrics were cut to shape, assembled in the form of the collar, and soaked at room temperature in a mixture of equal parts by volume of benzyl alcohol and ethanol.

Excess of the softening liquid was then removed and the assembly was then pressed at 150° C. for two minutes between the platens of a "daylight" press. The finished collar was then removed.

*Example 11*

The process was carried out as in Example 10, but using as the softening liquid a mixture of equal parts by volume of nitroethane and ethanol.

In making the three-ply laminates described above, an object has been to avoid substantial softening and flow in the fibres of the outer layers. This confining of the fibres to be softened and caused to flow during bonding to the inner layers is desirable when it is important that the outer layers should not exhibit a glazed appearance. For some purposes, however, a glazed appearance of the outer layers is no disadvantage, and in making laminates for such purposes the interlayer may be of non-thermoplastic material and the outer layers may contain the fibre that is intended to soften and flow. Similarly, laminates may be made in which the fibre to be softened and caused to flow is an acetone-soluble cellulose acetate fibre contained in the outer layers, the inner layers containing high-acetyl cellulose acetate fibres which, under the conditions of the bonding, do not substantially soften or flow. Laminates can also be made in which each layer contains high-acetyl cellulose acetate fibres, alone or in admixture with fibres of acetone-soluble cellulose acetate or other thermoplastic material that softens more readily than the high-acetyl cellulose acetate, or of non-thermoplastic fibre or fibre that does not soften substantially during the bonding operation.

Other things being equal, the higher the proportion, in the fabric assembly, of material that is caused to flow under the temperature and pressure applied in the bonding operation, the stiffer will be the product obtained. Thus, with a sufficient proportion of the cellulose acetate that is to be softened in the fabric assembly, laminates can be formed, during or after the bonding operation, in three-dimensional shapes, which they retain on cooling. Hat shapes and brassières can, for instance, be formed in this way between heated male and female moulding members. Strong, rigid laminates, suitable, for instance, for the construction of suitcases and boxes, can be made from a few layers of heavy fabric or from many layers of a lighter fabric containing a large proportion of the high-acetyl fibre. This fibre may be present in the form of monofils or multi-filament yarns of heavy denier, e. g. 1,000 or more. In all these applications the high-acetyl fibres show to advantage over fibres of acetone-soluble cellulose acetate, e. g. in high resistance to water, and retention of stiffness.

Having described our invention, what we desire to secure by Letters Patent is:

1. The process which comprises forming a fabric laminate by bonding together under heat and pressure a non-thermoplastic fabric and a fabric containing high-acetyl cellulose acetate melt-spun fibres with the aid of a liquid that, at the pressing temperature, has a strong softening action on the cellulose acetate fibres, but not on the non-thermoplastic fibres, the cellulose acetate containing 60–62.5% of combined acetic acid, and the softening liquid comprising a major proportion of acetone and a minor proportion of a liquid selected from the class consisting of cyclohexanone, cyclopentanone and the methyl cyclohexanones.

2. The process which comprises forming a fabric laminate by bonding together under heat and pressure a non-thermoplastic fabric and a fabric containing high-acetyl cellulose acetate melt-spun fibres with the aid of a liquid that, at the pressing temperature, has a strong softening action on the cellulose acetate fibres, but not on the non-thermoplastic fibres, the cellulose acetate containing 60–62.5% of combined acetic acid, and the softening liquid comprising a mixture of cyclohexanone, isopropanol and acetone in percentages by weight of: 9–13% cyclohexanone, 15–25% isopropanol and 62–78% acetone.

References Cited in the file of this patent

UNITED STATES PATENTS

| | | |
|---|---|---|
| 2,126,821 | Schneider | Aug. 16, 1938 |
| 2,143,205 | Muller | Jan. 10, 1939 |
| 2,202,025 | Reed | May 28, 1940 |
| 2,218,029 | Hubert et al. | Oct. 15, 1940 |
| 2,272,294 | Finlayson | Feb. 10, 1942 |
| 2,437,704 | Moncrieff et al. | Mar. 16, 1948 |
| 2,657,973 | Johnson et al. | Nov. 3, 1953 |

FOREIGN PATENTS

| | | |
|---|---|---|
| 512,820 | Great Britain | Sept. 26, 1939 |
| 152,179 | Australia | July 3, 1953 |
| 719,853 | Great Britain | Dec. 8, 1954 |
| 730,042 | Great Britain | May 18, 1955 |
| 748,772 | Great Britain | May 9, 1956 |